July 18, 1950 F. R. McFARLAND 2,515,831
TRANSMISSION MECHANISM
Filed Feb. 19, 1945
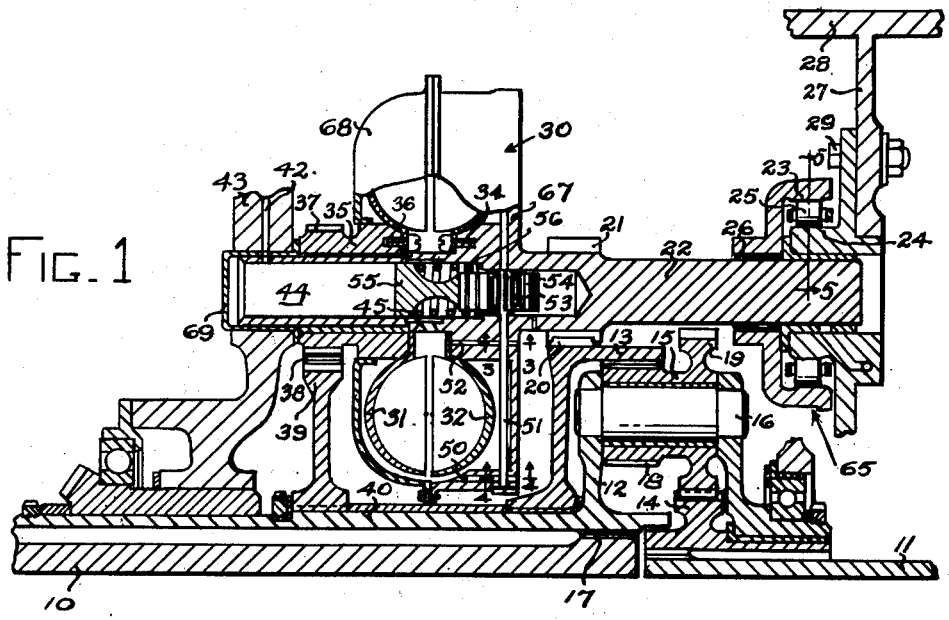
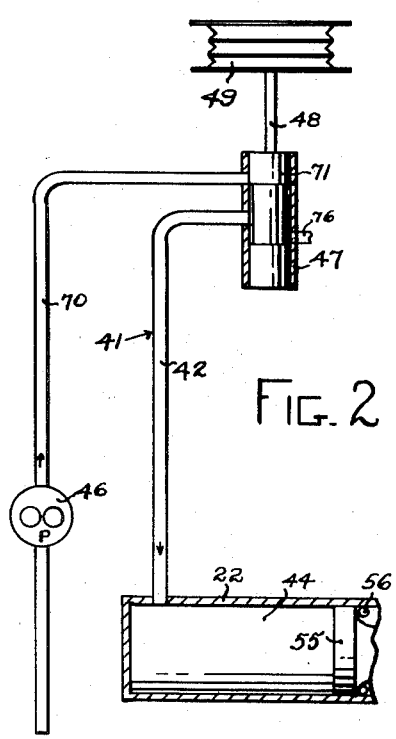
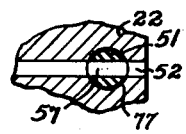
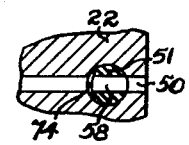
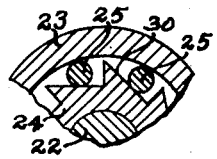
INVENTOR.
FOREST R. McFARLAND
BY
Sibbetts & Hart
ATTORNEYS Patented July 18, 1950

2,515,831

UNITED STATES PATENT OFFICE 2,515,831

TRANSMISSION MECHANISM

Forest R. McFarland, Huntington Woods, Mich., assignor to Packard Motor Car Company, Detroit, Mich., a corporation of Michigan Application February 19, 1945, Serial No. 578,603

14 Claims. (Cl. 74—688)

This invention relates to transmission mechanism and more particularly to variable speed mechanism.

An object of the invention is to provide transmission mechanism in which the drive may be selected for a low fixed gear ratio or for an infinite speed range above the low speed.

Another object of the invention is to provide an infinite speed drive mechanism in which the selection of speed is made at will by controlling the fluid volume in a fluid clutch.

Another object of the invention is to provide an epicyclic gearing mechanism with control means whereby a definite low speed or a higher infinite speed range may be obtained.

These and other objects of the invention will appear from the following description taken in connection with the drawings, which form a part of this specification, and in which:

Fig. 1 is a longitudinal sectional view of transmission mechanism embodying the invention;

Fig. 2 is a diagrammatic view of a fluid control system for the fluid clutch;

Fig. 3 is a sectional view taken on line 3—3 of Fig. 1 showing the fluid clutch air vent and control;

Fig. 4 is a sectional view taken on line 4—4 of Fig. 1 showing the outlet and control for fluid in the clutch;

Fig. 5 is a sectional view taken on line 5—5 of Fig. 1 showing the one-way control brake for the gearing.

Referring to the drawings, there is shown a drive shaft 10 and a driven shaft 11 arranged preferably in axial alignment. These shafts are geared together by epicyclic gearing, of the planetary type, consisting of carrier 12, ring gear 13, sun gear 14 and gear spool 15 rotatably mounted on pin 16 fixed to the carrier. It will be understood that more than one gear spool may be employed if desired. One element of the planetary gearing is controlled in its rotation and the ring gear is preferably such element. The carrier is fixed to the drive shaft by splines 17 and the sun gear is preferably formed integral with the driven shaft. The gear spool is comprised of gears 18 and 19, gear 18 meshing with ring gear 13 and gear 19 meshing with sun gear 14.

The ring gear is controlled to provide a fixed low speed gear ratio or a higher infinite speed range. One device for such control is illustrated but several of these devices may be employed in order to balance the mechanism.

The ring gear rotation is controlled by a one-way brake device 65 and a drive device including a fluid clutch 30. These devices are associated with a layshaft 22 to which is fixed a gear 21 meshing with teeth 20 on the ring gear.

When the fluid clutch is ineffective, the layshaft would be driven in a retrograde direction by the ring gear and no drive through the gearing would occur without the one-way brake device which acts to prevent such retrograde rotation. The brake device includes members 23 and 24 and intermediate rollers 25. Member 23 is fixed to the layshaft by splines 26 and member 24 is fixed to wall 27 of the transmission casing 28 by bolts 29. Member 24 has cam surfaces 30 and rollers 25 are positioned between such surfaces and member 23. Member 24, being fixed to the casing, will act as an abutment to prevent retrograde rotation of the layshaft which will automatically hold gear 13 stationary to establish low speed drive at a fixed gear ratio.

When a driving speed above low speed is desired the drive device for the ring gear is made effective so that the layshaft is driven from the drive shaft causing it to overrun the one-way brake device and driving the ring gear 13 reversely relative to the direction of the carrier rotation. This drive device for the ring gear includes the fluid clutch 30 in which the fluid volume is controlled at will to provide infinite driving speeds for the ring gear.

The fluid clutch has an impeller member 31 and a driven member 32, the latter member being fixed to the layshaft by bolts 34. The drive device also includes a sleeve 35 fixed to impeller member 31 by fasteners 36, such sleeve forming an extension of gear 37 meshing with idler gear 38 that is in mesh with gear 39 splined on sleeve 40 forming an extension of carrier 12. It will be understood that gear 39 rotates in unison with drive shaft 10 and could be fixed directly thereto when conditions permit.

Fluid is supplied to the clutch 30 by a system 41 including a valve housing 47 having an inlet conduit 70 leading from a suitable source of fluid supply and an outlet passage 42 that may be formed in wall 43 of the casing 28. The housing 47 also has a vent 76. Pump 46 is interposed in conduit 70 and passage 42 communicates with chamber 44 formed in an end of the layshaft. A port 45 in the layshaft connects the chamber with the interior of the clutch 30 and a cap 69 is fitted over the open end of the layshaft to close chamber 44.

Fluid flow to the clutch 30 may be controlled in various ways either automatically or manually. A valve member 71 in housing 47 has a stem 48 that may be shifted axially to move the valve member to shut off or establish fluid flow from conduit 70 to passage 42. As shown, the stem is actuated by an aneroid 49 and such motor means is particularly useful when the transmission mechanism is utilized to drive a supercharger of airplane motors. Fluid flow to the fluid clutch is also controlled by a piston valve device 55 shiftable relative to port 45. This piston valve is arranged in chamber 44 and is normally moved to close port 45 to the inlet end of the chamber by spring 56. The piston valve is shifted to open port 45 by fluid pressure entering the chamber 44 from passage 42.

Fluid drains from the fluid clutch 30 through passage 50 in the layshaft flange 67 forming with member 68 a casing around the clutch impeller and driven members. An air vent passage 52 also extends through flange 67 adjacent the axis of the clutch. Flow through these fluid and air outlet passages is controlled by valve 51 that may be operated in various ways but preferably in conjunction with the piston valve device. Valve 51 is in the form of a rod and projects through the major portion of the layshaft flange 67 and through chamber 44. Gear 53 in the chamber is fixed to valve 51 and meshes with rack 54 fixed to piston valve 55. As the piston valve and rack reciprocate, gear 53 and valve 51 are rotated. Passage 57 extends through the stem valve in relation to fully open air vent passage 52 and passage 58 extends through the stem valve in relation to open fluid outlet passage 50. Thus turning of the stem valve by the rack and gear will open or close the fluid and air outlet passages in timed relation with the control of fluid through port 45. The inlet end 74 of passage 58 is crescent shaped to more gradually open or close passage 50.

When the fluid control system is in the relation shown in Fig. 2, valve 71 will shut off the fluid supply to chamber 44, piston valve 55 will be moved by spring 56 to close port 45 and valve 51 will be turned to fully open air and fluid outlet passages 52 and 50. The fluid clutch will be drained so that the drive device for the layshaft will be ineffective and the one-way brake device will prevent retrograde rotation of the layshaft to thus hold ring gear 13 stationary establishing low speed drive through the transmission mechanism.

As the aneroid, or other means, shifts valve 71 to permit fluid flow into chamber 44, the piston valve 55 will be moved to open port 45 so that fluid can flow into the fluid clutch. This piston valve movement will also rotate the valve 51, through means of the rack and gear, toward position closing passages 50 and 52 except for slight venting by annular groove 77. The layshaft is driven at an infinite speed by the clutch depending upon the slip and the slip in the clutch is determined by the fluid volume therein. Thus the control can vary the volume of fluid in the clutch and thereby vary the speed of the layshaft drive of the ring gear 13. As the layshaft becomes effective it will rotate forwardly overrunning the one-way brake and rotating the ring gear in a retrograde direction to thus increase the driving speed in a range above low speed drive.

The fluid volume in the clutch could be varied by operation of any one of the fluid flow control devices 71, 55 and 51 but I prefer the timed combination of such elements as the control. The crescent inlet 74 of passage 58 and the air vent passage both tend to provide for quick emptying of fluid from the fluid clutch.

It will be understood that various forms of the invention other than that described above may be used without departing from the spirit or scope of the invention.

What is claimed is:

1. Transmission mechanism comprising a drive shaft, a driven shaft, planetary gearing geared to said shafts including a ring gear, means including a fluid clutch driven from the drive shaft for rotating said ring gear, means for supplying fluid to the clutch, means for draining fluid from the clutch, a valve device operable to control fluid flow through the supply means, a valve device controlling fluid flow through the drain means, and means interconnecting said valve devices for operation in a predetermined relation, and aneroid responsive means controlling fluid flow to the supply valve device.

2. Transmission mechanism comprising a drive shaft, a driven shaft, planetary gearing geared to said shafts including a ring gear, means including a fluid clutch actuated by the drive shaft for rotating said ring gear, a valve controlled drain means for the fluid clutch, a fluid supply system for the clutch, a valve device in said system operable to control fluid flow therethrough, and a normally closed valve member in the system between the valve device and the fluid clutch, opening in response to fluid pressure in the system to control the fluid flow into the clutch.

3. Transmission mechanism comprising a drive shaft, a driven shaft, planetary gearing geared to said shafts and including a controlled ring gear, drive means driven from the drive shaft for rotating said ring gear, said drive means including a fluid clutch and a layshaft between the clutch and the ring gear, a fluid supply system for the clutch passing partly through the layshaft, a valve device in the layshaft controlling fluid flow in the system to the clutch, and controlled fluid outlet means for the clutch.

4. Transmission mechanism comprising a drive shaft, a driven shaft, planetary gearing geared to said shafts and including a controllable ring gear, power means driven from the drive shaft for rotating said ring gear at infinite speed including a fluid clutch and a layshaft between the ring gear and the driven portion of the clutch, a pressure fluid system for supplying fluid to the clutch including a chamber in the layshaft opening to the interior of the clutch, a valve in the chamber, spring means urging said valve to shut off fluid flow to the clutch, a valve operable to control fluid flow to the chamber, and controlled means for draining fluid from the clutch.

5. Transmission mechanism comprising a drive shaft, a driven shaft, planetary gearing interconnecting said shafts and including a ring gear, drive means including a fluid clutch for rotating said ring gear from the drive shaft, a controlled fluid system for supplying fluid to the clutch, a controlled outlet passage for fluid from the clutch, a controlled air vent passage for the clutch, a controlled inlet passage for supplying fluid from the fluid supply system to the clutch, and interconnected pressure responsive valve means controlling the fluid inlet and outlet passages and the air vent passage.

6. Transmission mechanism comprising a drive shaft, a driven shaft, planetary gearing interconnecting said shafts and having a controlled element, means including a fluid clutch driven by the drive shaft for rotating said controlled element, means for draining and filling said clutch, aneroid actuated valve means controlling the last named means to increase the quantity of fluid in the clutch with a reduction of air pressure and to reduce the quantity of fluid in the clutch with an increase of air pressure, and means effective to prevent rotation of said controlled element when the fluid clutch is drained.

7. Transmission mechanism comprising a drive shaft, a driven shaft, planetary gearing interposed between said shafts and having a controlled gear, a layshaft geared to said controlled gear, a fluid clutch driven from the drive shaft for driving the layshaft, fluid pressure responsive valve means for draining and filling said fluid clutch, and aneroid actuated means controlling said valve means to increase the quantity of fluid in the fluid clutch when the aneroid is subjected to a reduction of pressure and to reduce the quantity of fluid in the fluid clutch when the aneroid is subjected to an increase of pressure, and means effective to prevent retrograde rotation of said controlled gear when said clutch is drained.

8. Transmission mechanism comprising a drive shaft, a driven shaft, planetary gearing interposed between said shafts and having a controlled element, means including a fluid clutch operable to drive said controlled element, valve means for regulating the volume of fluid in said clutch, and an aneroid controlling said valve means to increase the quantity of fluid in the fluid clutch when the aneroid is subjected to a reduction of pressure and to reduce the quantity of fluid in the fluid clutch when the aneroid is subjected to an increase of pressure.

9. Transmission mechanism for the supercharger drive of an airplane comprising a drive shaft, a driven shaft, planetary gearing interconnecting said shafts and having a ring gear, means driven by the drive shaft and including a fluid clutch operable to drive said ring gear to effect a high speed drive, means for increasing the volume of fluid in said clutch in response to a reduction of air pressure due to operation of the airplane at higher altitudes, and means automatically operable to prevent retrograde rotation of said ring gear when the fluid clutch is ineffective.

10. Transmission mechanism comprising a drive shaft, a driven shaft, planetary gearing interposed between said shafts and including a ring gear, drive means including a fluid clutch driven by the drive shaft for rotating said ring gear, a source of fluid pressure for supplying fluid to the clutch, and aneroid actuated means for controlling the supply of fluid from said source to increase the quantity of fluid in the clutch with a reduction of air pressure and to reduce the quantity of fluid in the clutch with an increase of air pressure.

11. Transmission mechanism comprising a drive shaft, a driven shaft, planetary gearing interconnecting said shafts and including a ring gear, means including a fluid clutch driven from the drive shaft for rotating said ring gear, means for supplying fluid to the clutch, means for draining fluid from the clutch, a pressure responsive inlet valve operable to control fluid flow through the fluid supply means, an aneroid actuated valve controlling the flow of fluid to the pressure responsive valve, an outlet valve controlling fluid flow through the drain means, and means operated by the pressure responsive inlet valve for actuating the outlet valve for increasing the quantity of fluid in the clutch when the aneroid is subjected to a reduction of pressure and for reducing the quantity of fluid in the clutch when the aneroid is subjected to an increase of pressure.

12. Transmission mechanism comprising a drive shaft, a driven shaft, planetary gearing geared to said shafts and including a controlled ring gear, drive means driven by the drive shaft for rotating said ring gear, said drive means including a fluid clutch and a layshaft between the fluid clutch and the ring gear, one-way brake means operative to prevent retrograde rotation of said layshaft and ring gear when the fluid clutch is ineffective, and aneroid actuated means operable to control the fluid content of said clutch by increasing the quantity of fluid therein when the aneroid is subjected to reduced pressure and by reducing the quantity of fluid therein when the aneroid is subjected to increased pressure.

13. A transmission comprising a driving shaft, a driven shaft, sun and planet pinion gears interconnecting the driving and driven shafts, a ring gear associated with the planet pinion gears, one-way braking means to lock the ring gear against rotation in one direction, variable speed driving means to rotate the ring gear in the opposite direction, the variable speed driving means including a fluid coupling having a fluid energizing impeller operably connected to the driving shaft and an energy absorbing turbine operably connected to the ring gear, fluid inlet and outlet passages to vary the quantity of fluid in the coupling, interconnected valve means controlling the inlet and outlet passages, and an aneroid controlling the valve means to increase the quantity of fluid in the coupling when the aneroid is subjected to reduced pressure and to reduce the quantity of fluid in the coupling when the aneroid is subjected to increased pressure.

14. A transmission comprising a driving shaft, a driven shaft, planetary gearing including planet pinions interconnecting the driving and driven shafts, a ring gear associated with the planet pinions, a control shaft, gear means between the control shaft and the ring gear, one-way braking means to lock the control shaft against rotation in one direction, means including a fluid coupling having impeller and turbine members operably connected to the driving and control shafts respectively, fluid inlet and outlet passages for the coupling, interconnected valve means controlling the inlet and outlet passages, fluid pressure responsive means controlling the inlet and outlet valve means, and an aneroid controlled valve to increase the quantity of fluid in the coupling as the aneroid is subjected to reduced pressure and to decrease the quantity of fluid in the coupling as the aneroid is subjected to increased pressure.

FOREST R. McFARLAND.

REFERENCES CITED

The following references are of record in the file of this patent:

UNITED STATES PATENTS

| Number | Name | Date |
| --- | --- | --- |
| 1,962,972 | Stock | June 12, 1934 |
| 1,987,985 | Bauer | Jan. 15, 1935 |
| 2,024,842 | Bauer | Dec. 17, 1935 |
| 2,266,085 | Sanderson | Dec. 16, 1941 |
| 2,276,794 | Ricci | Mar. 17, 1942 |

FOREIGN PATENTS

| Number | Country | Date |
| --- | --- | --- |
| 144,349 | Great Britain | June 10, 1930 |